US008834590B2

(12) United States Patent
Kuwada et al.

(10) Patent No.: US 8,834,590 B2
(45) Date of Patent: Sep. 16, 2014

(54) AIR-CONDITIONER FOR VEHICLE

(75) Inventors: Katsuji Kuwada, Kariya (JP); Shinya Murayama, Kariya (JP)

(73) Assignee: Denso Corporation, Kariya (JP)

( * ) Notice: Subject to any disclaimer, the term of this patent is extended or adjusted under 35 U.S.C. 154(b) by 149 days.

(21) Appl. No.: 13/599,069

(22) Filed: Aug. 30, 2012

(65) Prior Publication Data

US 2013/0074459 A1    Mar. 28, 2013

(30) Foreign Application Priority Data

Sep. 26, 2011    (JP) ................................. 2011-209207

(51) Int. Cl.
*B60H 1/00*        (2006.01)
*B01D 46/42*      (2006.01)

(52) U.S. Cl.
CPC ............ *B01D 46/42* (2013.01); *B01D 2279/50* (2013.01)
USPC ................. 55/385.3; 55/418; 55/420; 55/422; 55/467

(58) Field of Classification Search
USPC ........ 55/385.1, 478, 479, 482, 500, 529, 309, 55/413, 414, 467, 503, DIG. 34; 96/417, 96/109, 131, 134, 397; 123/198 E, 518; 95/146; 138/37, 39
See application file for complete search history.

(56) References Cited

U.S. PATENT DOCUMENTS

| | | | | |
|---|---|---|---|---|
| 5,968,214 A * | 10/1999 | Nagata et al. | ................. | 55/385.3 |
| 5,968,215 A * | 10/1999 | Webb | ............................ | 55/385.3 |
| 7,670,411 B2 * | 3/2010 | Suzuki | ............................ | 96/134 |
| 8,048,179 B2 * | 11/2011 | Miller et al. | .................... | 55/312 |
| 8,435,337 B2 * | 5/2013 | Lee et al. | ......................... | 96/397 |
| 2005/0235833 A1 * | 10/2005 | Sassa et al. | ..................... | 96/417 |
| 2010/0035534 A1 | 2/2010 | Kajiya | | |

FOREIGN PATENT DOCUMENTS

| | | |
|---|---|---|
| JP | 10-006740 | 1/1998 |
| JP | 2003-326939 | 11/2003 |
| JP | 2007-191119 | 8/2007 |
| JP | 2010-036834 | 2/2010 |

OTHER PUBLICATIONS

Office Action mailed Jun. 10, 2014 in corresponding JP Application No. 2011-209207 with English translation.

* cited by examiner

*Primary Examiner* — Duane Smith
*Assistant Examiner* — Minh-Chau Pham
(74) *Attorney, Agent, or Firm* — Harness, Dickey & Pierce, PLC

(57) ABSTRACT

An air intake device has a first inlet through which outside air flows and a second inlet through which inside air flows. A filter is arranged to cover a lower part of the first inlet and a lower part of the second inlet. An air sending device is located under the filter, and the filter is arranged to be inclined to an air intake part of the air sending device. The air intake device is configured to be switched between an outside air mode and a two, layer mode. The air intake device defines a continuation passage at the outside air mode. The continuation passage causes the outside air to flow from the lower part of the first inlet to the lower part of the second inlet.

12 Claims, 6 Drawing Sheets

AIR-CONDITIONER FOR VEHICLE

CROSS REFERENCE TO RELATED APPLICATION

This application is based on Japanese Patent Application No. 2011-209207 filed on Sep. 26, 2011, the disclosure of which is incorporated herein by reference in its entirety.

TECHNICAL FIELD

The present disclosure relates to an air-conditioner for a vehicle.

BACKGROUND

JP-A-2010-36834 (US 2010/0035534) describes an air-conditioner for a vehicle, and the air-conditioner has a two layer mode and an outside air mode. The air-conditioner has a first inlet introducing outside air and a second inlet introducing inside air. Further, an outside air passage and an inside air passage are independently defined in the air-conditioner.

When the two layer mode is selected, the first inlet and the second inlet are opened. The outside air and the inside air are simultaneously drawn into an air sending unit respectively from the first inlet and the second inlet, and flow in the outside air passage and the inside air passage respectively toward an air conditioning unit through a filter and a blower.

When the outside air mode is selected, only the first inlet is opened, and the outside air passage and the inside air passage are combined with each other. The outside air is drawn into the air sending unit from the first inlet, and flows toward the air conditioning unit through the whole surface of the filter and the blower.

While the outside air passes the filter, foreign matters such as dust or pollen are caught by the filter. However, at the two layer mode, because the outside air flows only a part of the filter adjacent to the first inlet, the foreign matters contained in the outside air adhere to the part of the filter adjacent to the first inlet.

When the two layer mode is switched into the outside air mode, the outside air flows through not only the part of the filter adjacent to the first inlet but also the other part of the filter adjacent to the second inlet. However, the pressure loss becomes higher in the part of the filter adjacent to the first inlet than the other part of the filter adjacent to the second inlet, so distribution of flow speed of the outside air becomes nonuniform over the filter. Further, because the clogging is accelerated in the part of the filter adjacent to the first inlet, it may be required to frequently replace the filter with a new filter.

SUMMARY

According to an example of the present disclosure, an air-conditioner for a vehicle includes an air conditioning unit which conditions air to be sent into a passenger compartment of the vehicle, and an air sending unit which supplies air to the air conditioning unit. The air sending unit includes an air intake device, a filter and an air sending device. The air intake device has a first inlet through which outside air outside of the passenger compartment flows into the air intake device and a second inlet through which inside air inside of the passenger compartment flows into the air intake device. The first inlet and the second inlet are opened at a two layer mode. The first inlet is opened and the second inlet is closed at an outside air mode. The air intake device is configured to be switched between the outside air mode and the two layer mode. The filter is arranged to cover a lower part of the first inlet and a lower part of the second inlet to collect a foreign matter contained in the outside air and the inside air. The filter has a first part adjacent to the first inlet and a second part adjacent to the second inlet. The air sending device is located under the filter. The air intake device defines a continuation passage at the outside air mode. The continuation passage causes the outside air drawn from the first inlet to flow from the lower part of the first inlet to the lower part of the second inlet. The air sending device draws the outside air through the first inlet, the continuation passage and the first part and the second part of the filter at the outside air mode. The filter is arranged to be inclined to an air intake part of the air sending device.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
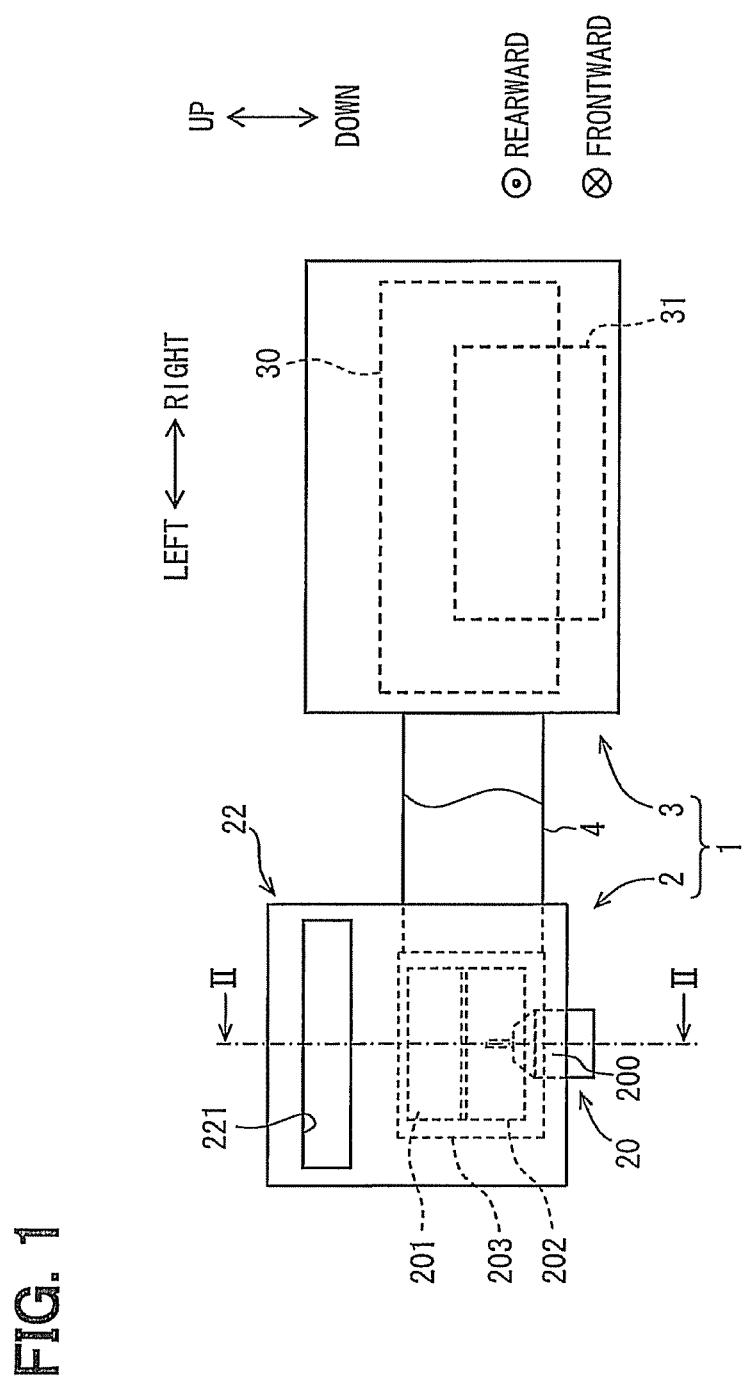
FIG. 1 is a schematic elevation view illustrating an air-conditioner according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

An air-conditioner 1 for a vehicle according to a first embodiment will be described with reference to FIGS. 1-5. FIG. 1 is a schematic elevation view illustrating the air-conditioner 1 which is seen from a rear side of the vehicle.

As shown in FIG. 1, the air-conditioner 1 has an air sending unit 2, an air conditioning unit 3 and a duct part 4. The duct part 4 defines an air passage which connects the air sending unit 2 to the air conditioning unit 3. The air conditioning unit 3 controls a temperature of air sent from the air sending unit 2. The air conditioning unit 3, the air sending unit 2, and the duct part 4 are made of resin material such as polypropylene (PP) or PP resin material containing a predetermined amount of talc and glass fiber to improve the strength, respectively. The air conditioning unit 3 is arranged on an inner side of an instrument panel, and is located at a center section in a width direction of the vehicle. The air sending unit 2 is arranged on the inner side of the instrument panel, and is located offset from the center section toward a passenger seat (leftward).

The air sending unit 2 has an air intake device 22, a filter 21 and a blower 20. The air intake device 22 intakes at least one of inside air and outside air. The inside air is air inside of a passenger compartment of the vehicle, and the outside air is air outside the passenger compartment. The filter 21 collects a foreign matter such as dust contained in at least one of the outside air and the inside air. The blower 20 is located under the filter 21, and draws at least one of the outside air and the inside air through the air intake device 22.

The blower 20 has an upper fan 201 and a lower fan 202, and the fan 201, 202 may be constructed of centrifugal multiblade fan. The fans 201, 202 are coaxially arranged in an up-and-down direction in a scroll casing 203 with the same rotation axis, and are simultaneously rotated by a motor 200.

Figure 2:
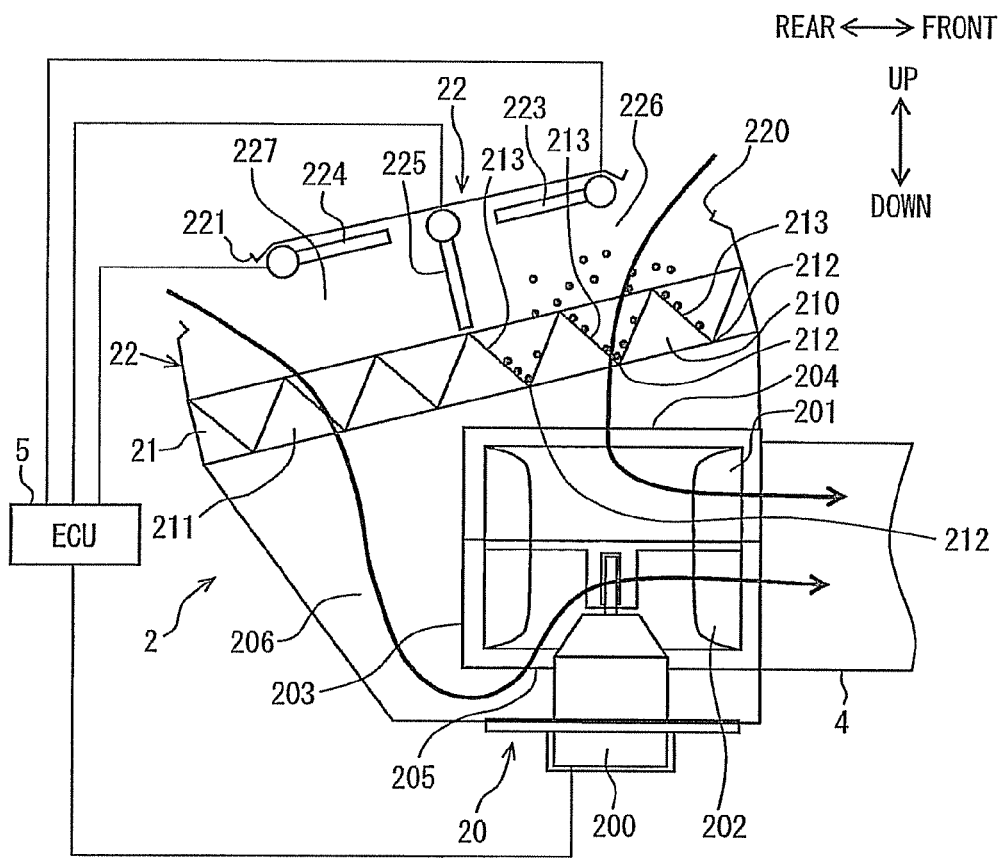
FIG. 2 is a schematic view illustrating a flow of air in the air-conditioner at a two layer mode.

As shown in FIG. 2, the casing 203 has an air intake port 204 on the upper face as an air intake part of the fan 201, and an air intake port 205 on the lower face as an air intake part of the fan 202. When the air-conditioner 1 is mounted to the vehicle, the upper face and the lower face of the scroll casing 203 are located in parallel or almost parallel with a ground, therefore the air intake ports 204 and 205 are open in parallel or almost parallel with the ground.

The upper fan 201 draws air from the intake port 204 downward in the scroll casing 203, and the air is sent into the duct part 4, as shown in an arrow direction of FIG. 2, along the spiral shape of the scroll casing 203. The lower fan 202 draws air from the intake port 205 upward in the scroll casing 203, and the air is sent into the duct part 4, as shown in an arrow direction of FIG. 2, along the spiral shape of the scroll casing 203.

The air intake device 22 has an outside inlet 220 (first inlet) and an inside inlet 221 (second inlet). Outside air flows into the device 22 through the outside inlet 220, and inside air flow into the device 22 through the inside inlet 221. The air intake device 22 has a first door 223 which opens or closes the outside inlet 220 and a second door 224 which opens or closes the inside inlet 221. An air inlet mode is switched by the door 223, 224.

The air intake device 22 further has a passage partition door 225 which changes a route of air flowing in the air intake device 22 in accordance with the air inlet mode together with the door 223, 224. The passage partition door 225 divides an interior space of the air intake device 22 into a first space adjacent to the outside inlet 220 and a second space adjacent to the inside inlet 221. The first space may correspond to an outside air passage 226, and the second space may correspond to an inside air passage 226

Figure 4:
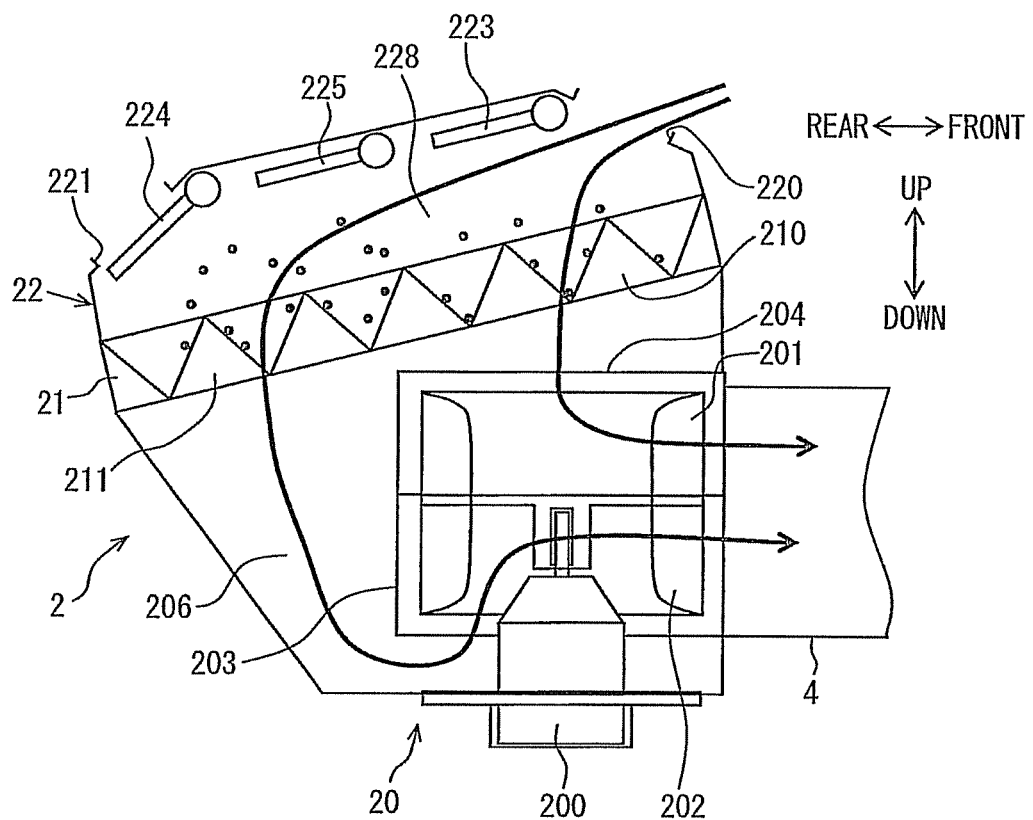
FIG. 4 is a schematic view illustrating a flow of air in the air-conditioner at an outside air mode.

Further, as shown in FIG. 4, the passage partition door 225 cancels the partition, thereby the first space adjacent to the outside inlet 220 and the second space adjacent to the inside inlet 221 communicate with each other. That is, the interior space of the air intake device 22 can be made into one space by controlling the door 225. The one space may correspond to a continuation passage 228.

A control device 5 (ECU) of the air-conditioner 1 controls the air inlet mode by controlling the air intake device 22 based on an indication defined by manual operation or a preset temperature. The control device 5 selects the air inlet mode among an outside air mode, an inside air mode or a two layer mode. Moreover, the control device 5 controls the amount of air sent by the blower 20 based on the indication defined by manual operation or the preset temperature. Moreover, the control device 5 controls an air outlet mode and doors which respectively open/close air outlets based on the indication defined by manual operation or the preset temperature.

The filter 21 is arranged to extend over both the lower part of the outside inlet 220 and the lower part of the inside inlet 221. At the two layer mode, the filter 21 collects dust contained in air flowing through two independent passages (the outside air passage 226 and the inside air passage 227). At the outside air mode, the filter 21 collects dust contained in air flowing through the continuation passage 228.

As shown in FIG. 2, the filter 21 is arranged to be inclined with respect to the air intake port 204 of the blower 20. The filter 21 is arranged in a manner that a first part 210 of the filter 21 adjacent to the outside inlet 220 is located higher than a second part 211 of the filter 21 adjacent to the inside inlet 221. The filter 21 has a wave-shaped cross-section. Specifically, the filter 21 has a zigzag shape defined by folding the filter 21, and the folded part defines a mountain part and a valley part 212.

The valley part 212 extends in a left-and-right direction of the vehicle, that is perpendicular to a flowing direction of outside air at the outside air mode. The wave shape in the cross-section of the filter 21 is formed to extend rearward, that is, in the flowing direction of outside air at the outside air mode. The filter 21 may be made of an air filter constructed by fibers.

At the two layer mode, as shown in FIG. 2, the blower 20 draws the outside air from the outside inlet 220 through the outside air passage 226 and the first part 210 of the filter 21, and draws the inside air from the inside inlet 221 through the inside passage 227 and the second part 211 of the filter 21.

At the outside air mode, as shown in FIG. 4, the blower 20 draws the outside air from the outside inlet 220 through the continuation passage 228 and both of the first part 210 and the second part 211 of the filter 21.

FIG. 2 illustrates the flow of air in the air sending unit 2 at the two layer mode. As shown in FIG. 2, the air intake device 22 defines the outside air passage 226 and the inside air passage independent from each other. At the two layer mode, the outside air is introduced downward from the outside inlet 220 through the outside passage 226, and the inside air is introduced downward from the inside inlet 221 through the inside passage 227. At the two layer mode, the first door 223 opens the outside inlet 220, and the second door 224 opens the inside inlet 221. Further, the passage partition door 225 is located to be perpendicular to the surface of the filter 21, thereby partitioning the interior space of the air intake device 22 into the outside passage 226 and the inside passage 227.

At the two layer mode, the upper fan 201 and the lower fan 202 are driven in the state where the interior space of the air intake device 22 is divided into the outside passage 226 and the inside passage 227. Thereby, the outside air drawn from the outside inlet 220 passes the outside passage 226 and the first part 210 of the filter 21, then is drawn by the fan 201 from the intake port 204 to be sent into the duct part 4. Moreover, the inside air drawn from the inside inlet 221 passes the inside passage 227 and the second part 211 of the filter 21, and flows downward in a side space 206 of the scroll casing 203, then is drawn by the fan 202 from the intake port 205 to be sent into the duct part 4.

Figure 3:
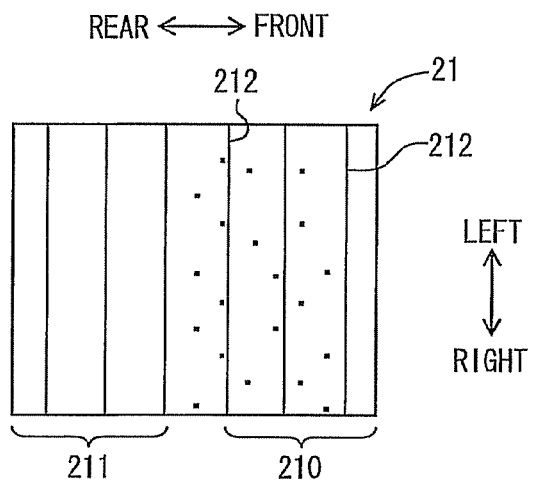
FIG. 3 is a schematic plan view illustrating a filter of the air-conditioner of FIG. 2.

At the two layer mode, the outside air passes only the first part 210 Of the filter 21 located adjacent to the outside inlet 220, therefore foreign matters such as dust or pollen contained in the outside air are collected by only the first part 210 of the filter 21. Therefore, as shown in FIG. 3, the foreign matters adhere to only the first part 210 of the filter 21 in the unbalanced state. Because the amount of foreign matters contained in the inside air is smaller than that of the outside air, foreign matter seldom adheres to the second part 211 of the filter 21.

FIG. 4 illustrates the flow of air in the air sending unit 2 at the outside air mode. As shown in FIG. 4, the inside inlet 221 is closed and the outside inlet 220 is opened. The air intake device 22 defines the continuation passage 228 through which the outside air flows from the lower part of the outside inlet 220 and the lower part of the inside inlet 221. At the outside air mode, the first door 223 opens the outside inlet 220, and the second door 224 closes the inside inlet 221. The passage partition door 225 defines the continuation passage 228 by being located to be almost in parallel with the surface of the filter 21.

At the outside air mode, the upper fan 201 and the lower fan 202 are driven in the state where the continuation passage 228 is defined in the interior space of the air intake device 22. Thereby, the outside air drawn from the outside inlet 220 flows through the continuation passage 228 from the outside inlet 220 toward the inside inlet 221, and passes through the whole surface of the filter 21.

Outside air passing through the first part 210 of the filter 21 is drawn by the upper fan 201 from the intake port 204 to be sent into the duct part 4. Outside air passing through the second part 211 of the filter 21 flows downward in the side space 206 of the scroll casing 203, and is drawn by the lower fan 202 from the intake port 205 to be sent into the duct part 4.

At the outside air mode, because the outside air flows through the continuation passage 228 from the outside inlet 220 toward the inside inlet 221, an air flow is generated to travel toward the inside inlet 221 around the surface of the filter 21 adjacent to the outside inlet 220.

When the two layer mode is switched into the outside air mode, the foreign matters adhering to the first part 210 of the filter 21 at the two layer mode are diffused toward the inside inlet 221 by the air flow traveling toward the inside inlet 221 from the outside inlet 220 through the continuation passage 228 at the outside air mode. Therefore, some of the foreign matters move to the second part 211 of the filter 21 from the first part 210 of the filter 21, and the foreign matters come to distribute uniform over the whole surface of the filter 21.

Figure 5:
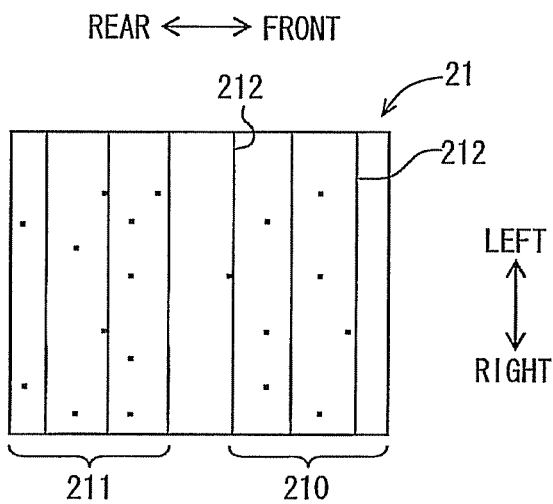
FIG. 5 is a schematic plan view illustrating a filter of the air-conditioner of FIG. 4.

As shown in FIG. 5, the foreign matters are uniformly distributed to stay on the outer surface of the filter 21 in both of the first part 210 and the second part 211. Thus, the amount of the foreign matters which continue adhering to the first part 210 of the filter 21 can be decreased by the switching from the two layer mode to the outside air mode. Therefore, clogging of the filter 21 can be reduced in the first part 210, and the clogging is balanced over the filter 21. Accordingly, the number of replacing the filter 21 can be reduced.

Figure 6:
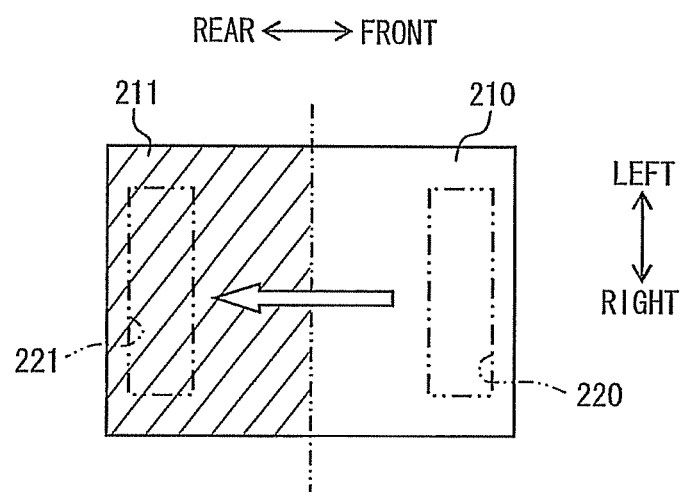
FIG. 6 is a schematic plan view illustrating a filter of the air-conditioner of the first embodiment.

When the air-conditioner 1 is mounted to the vehicle, the filter 21 is inclined to the ground in a manner that the first part 210 is located higher than the second part 211. Thereby, a hatched section of FIG. 6 is located lower in the filter 21, compared with a non-hatched section. Due to the inclined posture of the filter 21, the foreign matter adhering to the surface of the filter 21 is easily moved by the flow of outside air in a blank arrow direction of FIG. 6. Thus, the foreign matters can be distributed uniformly on the whole surface of the filter 21.

Figure 7:
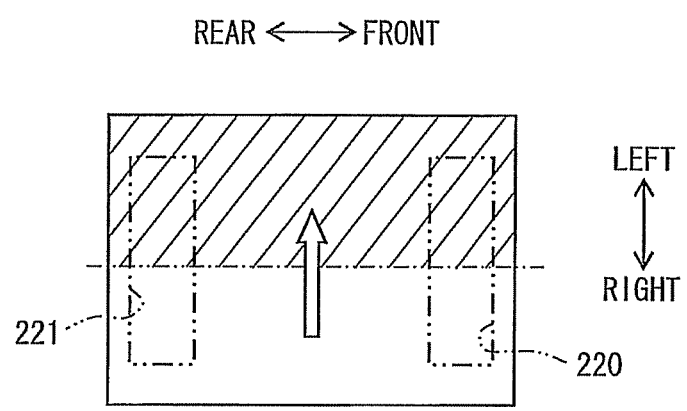
FIG. 7 a schematic plan view illustrating a modification example filter of the air-conditioner of the first embodiment.

Alternatively, the filter 21 may be arranged in a manner that a hatched section of FIG. 7 is located lower in the filter 21 compared with a non-hatched section. In this case, the filter 21 is arranged to be inclined to the ground in a manner that a right section of the filter 21 is located higher than a left section of the filter 21, when the air-conditioner 1 is mounted to the vehicle. Due to the inclined posture of the filter 21, the foreign matter adhering to the right section of the filter 21 at the two layer mode is easily moved by the flow of outside air in a blank arrow direction of FIG. 7. Thus, the foreign matters can be distributed uniform on the whole surface of the filter 21, and the replacement timing of the filter 21 can be delayed.

As shown in FIG. 1, the air conditioning unit 3 includes an evaporator 30, a heater core 31, and an air mixing door (not shown) in a case of the unit 3. The evaporator 30 is thin in the front-and-rear direction, and is arranged to cross an air passage defined in the case. Air sent from the air sending unit 2 flows into a front face of the evaporator 30 which extends in the up-and-down direction and the left-and-right direction of the vehicle. In the evaporator 30, air is cooled by absorbing evaporative latent heat of refrigerant of a refrigerating cycle.

The heater core 31 is arranged downstream of the evaporator 30 in the air flowing direction. Specifically, the heater core 31 is arranged on the rear side of the evaporator 30 through a predetermined interval. The heater core 31 heats air passing through the evaporator 30 using high-temperature water such as engine coolant as a heat source.

A bypass passage which bypasses the heater core 31 is defined on the upper side of the heater core 31, and the air cooled by the evaporator 30 flows through the bypass passage. Moreover, the air mixing door is located between the heater core 31 and the evaporator 30, and adjusts a ratio of the air heated by the heater core 31 and the air bypassing the heater core 31 through the bypass passage.

The air mixing door adjusts the ratio of the heated air and the cooled air by the position so as to control the temperature of air to be sent by the air-conditioner 1. The control device 5 controls the position of the air mixing door based on the indication defined by manual operation or the preset temperature.

The case of the unit 3 has an air mix chamber in which the air cooled by the evaporator 30 and the air heated by the heater core 31 are mixed with each other. The temperature of the mixed air is controlled in the chamber, and the mixed air is supplied to the passenger compartment with a proper ratio by controlling each door which opens or closes the air outlet connected to the passenger compartment.

According to the first embodiment, the air-conditioner 1 has the air sending unit 2 and the air conditioning unit 3. The air sending unit 2 is equipped with the air intake device 22, the filter 21, and the blower 20. The blower 20 is disposed under the filter 21.

At the two layer mode, the blower 20 draws outside air from the outside inlet 220 through the independent passage 226 and the first part 210 of the filter 21, and draws inside air from the inside inlet 221 through the independent passage 227 and the second part 211 of the filter 21.

At the outside air mode, the blower 20 draws outside air from the outside inlet 220 through the continuation passage 228 and both of the first part 210 and the second part 211 of the filter 21.

The air intake device 22 is configured to be switched between the outside air mode and the two layer mode. The filter 21 is arranged to be inclined with respect to the air intake part of the blower 20.

The foreign matters such as dust adhering to the first part 210 of the filter 21 at the two layer mode can be blown to the second part 211 of the filter 21 by the flow of outside air which flows toward the inside inlet 221 along the surface of the filter 21 at the outside air mode, and this advantage is more facilitated by the inclination posture of the filter 21. Thereby, the distribution of the foreign matters can be made uniform over the filter 21. Moreover, the clogging degree can be made uniform over the filter 21. Therefore, distribution of the air flow speed can be made uniform over the filter 21, and the life of the filter 21 can be increased.

The filter 21 is disposed in the air-conditioner 1 in a manner that the first part 210 is located higher than the second part 211.

Accordingly, the foreign matters such as dust adhering to the first part 210 of the filter 21 at the two layer mode can be blown to the second part 211 of the filter 21, more efficiently, because the second part 211 is located lower than the first part 210. Thus, the foreign matters can be uniformly distributed over the entire filter 21. Moreover, the clogging degree of the filter 21 can be balanced.

Furthermore, as shown in FIG. 4, a distance between the lower face of the filter 21 adjacent to the outside inlet 220 and the intake port 204 of the blower 20 is secured to be large, because the first part 210 of the filter 21 is located at the high position. Thus, resistance for the air intake can be reduced in the blower 20.

Moreover, the side space 206 of the scroll casing 203 can be made smaller, because the second part 211 of the filter 21 is located at the lower position. Therefore, the height dimension of the blower 20 can be reduced, and the size of the blower 20 can be made smaller.

The filter 21 has the wave-shaped cross-section including the valley part 212 that extends in a direction perpendicular to a flowing direction of the outside air which flows toward the inside inlet 221 at the outside air mode. That is, the filter 21 is formed to extend perpendicularly to the main direction of the outside air at the outside air mode, and is formed to have the inclination posture in which the second part 211 of the filter 21 is located at the lower position.

As shown in FIG. 2, the filter 21 has a slant face 213 in the wave-shaped cross-section, and a side of the slant face 213 adjacent to the intake inlet 221 is located higher than a side of the slant face 213 adjacent to the outside inlet 220. An inclination degree of the slant face 213 becomes smaller, because the filter 21 is arranged to be inclined. That is, the slant face 213 defined by folding the filter 21 becomes gentle.

Moreover, because a vector of the outside air passing through the first part 210 of the filter 21 at the two layer mode becomes approximately perpendicular to the slant face 213, the flow speed of air becomes high at the slant face 213. Thus, it becomes easy to deposit the foreign matters on the slant face 213. Furthermore, because the air passing through the continuation passage 228 at the outside air mode is easy to flow along the slant face 213, the foreign matter can be easily caught by the slant face 213.

Therefore, the large amount of the foreign matters deposited on the small-angled slant face 213 can be easily blown toward the intake inlet 221 by the flow of outside air at the outside air mode. Accordingly, the distribution of the foreign matters on the filter 21 can be made more uniform.

Second Embodiment

A second embodiment is a modification example of the first embodiment, and will be described with reference to FIGS. 8-11. An air sending unit 2A of the second embodiment has a filter 21A which is different from the filter 21 of the air sending unit 2 of the first embodiment.

Figure 9:
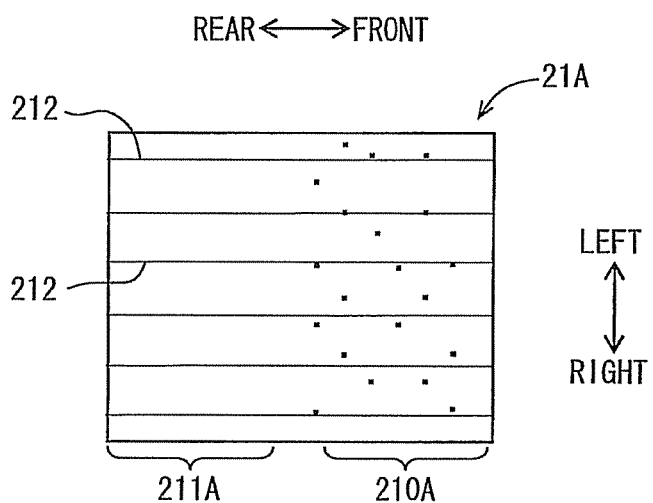
FIG. 9 is a schematic plan view illustrating a filter of the air-conditioner of FIG. 8.
Figure 11:
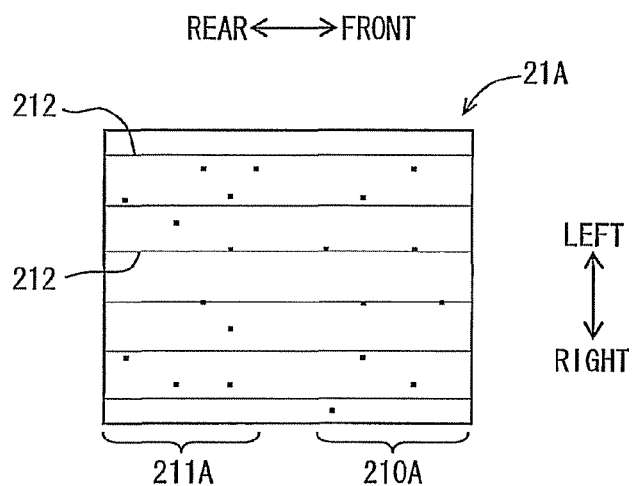
FIG. 11 is a schematic plan view illustrating a filter of the air-conditioner of FIG. 10.

As shown in FIGS. 9 and 11, in the filter 21A of the air sending unit 2A, a valley part 212 extends in a direction parallel to the main direction of the outside air flowing toward the inside inlet 221 at the outside air mode. That is, the valley part 212 and the mountain part extend in the front-and-rear direction, and the wave shape in the cross-section of the filter 21A extends in the left-and-right direction.

Figure 8:
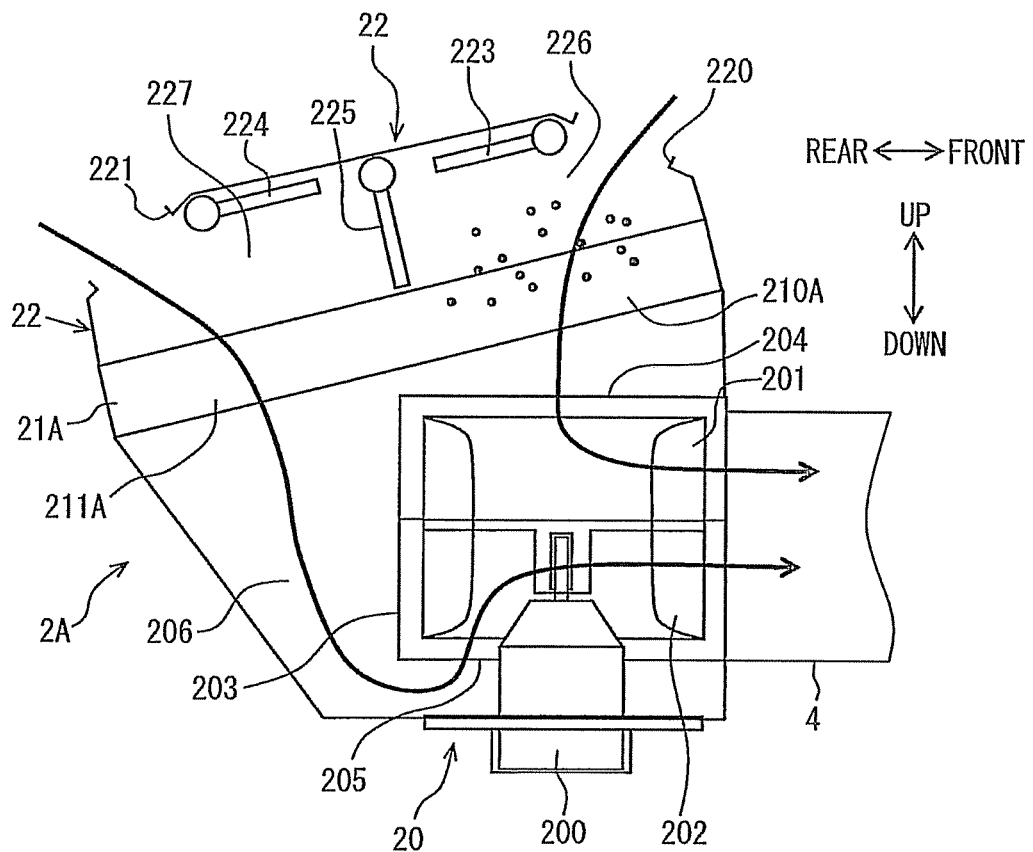
FIG. 8 is a schematic view illustrating a flow of air in an air-conditioner according to a second embodiment at a two layer mode.

As shown in FIG. 8, at the two layer mode, the outside air drawn from the outside inlet 220 passes the outside passage 226 and the first part 210A of the filter 21A, then is drawn by the fan 201 from the intake port 204 on the upper face of the scroll casing 203, so as to be sent into the duct part 4. Further, the inside air drawn from the inside inlet 221 passes the inside passage 227 and the second part 211A of the filter 21A, and flows downward in the side space 206 of the scroll casing 203, then is drawn by the fan 202 from the intake port 205 on the lower face of the scroll casing 203, so as to be sent into the duct part 4.

At the two layer mode, the outside air passes only the first part 210A of the filter 21A located adjacent to the outside inlet 220, and the foreign matters contained in the outside air are collected by only the first part 210A of the filter 21A. Therefore, as shown in FIG. 9, the foreign matters adhere to the first part 210A of the filter 21A in the unbalanced state. Because the amount of the foreign matters contained in the inside air is smaller than that in the outside air, a foreign matter seldom adheres to the second part 211A of the filter 21A.

Figure 10:
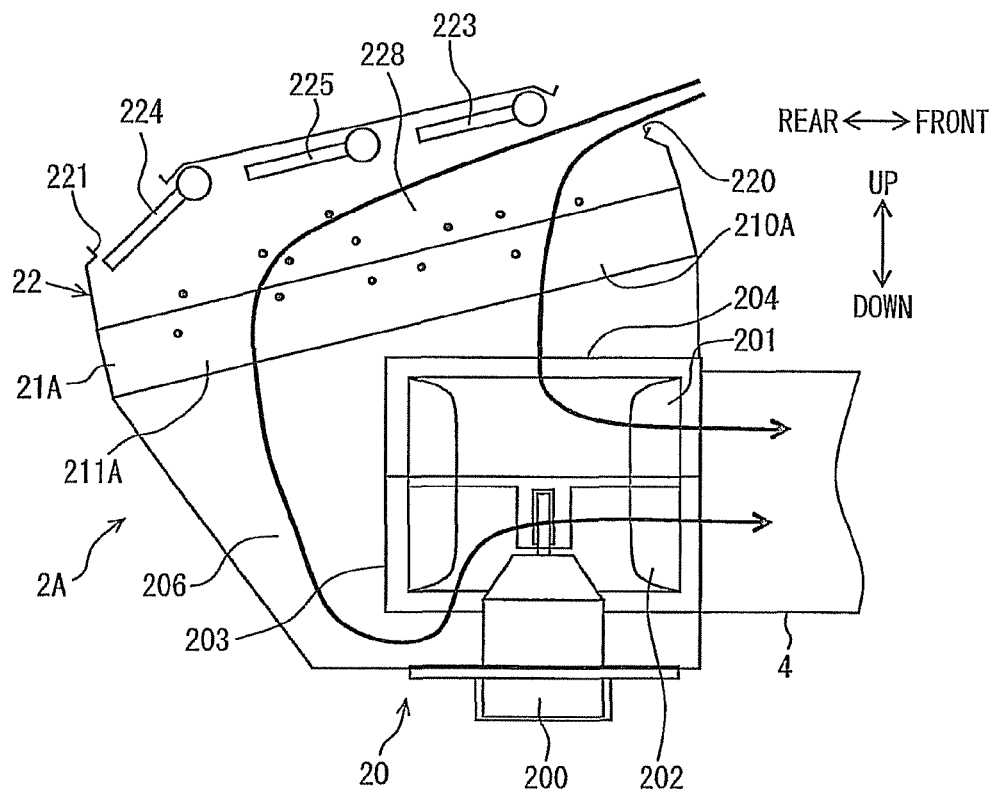
FIG. 10 is a schematic view illustrating a flow of air in the air-conditioner of the second embodiment at an outside air mode.

As shown in FIG. 10, at the outside air mode, the outside air drawn from the outside inlet 220 flows through the continuation passage 228 toward the inside inlet 221 from the outside inlet 220, and passes through the whole surface of the filter 21A. The outside air passing through the first part 210A of the filter 21A is drawn by the fan 201 from the intake port 204 to be sent into the duct part 4. The outside air passing through the second part 211A of the filter 21A flows downward in the side space 206 of the scroll casing 203, and is drawn by the fan 202 from the intake port 205 to be sent into the duct part 4.

At the outside air mode, because the outside air flows through the continuation passage 228 toward the inside inlet 221 from the outside inlet 220, an air flow is generated to flow toward the inside inlet 221 around the surface of the first part 210A of the filter 21A adjacent to the outside inlet 220.

Therefore, when the two layer mode is switched into the outside air mode, the foreign matters adhering to the first part 210A of the filter 21A at the two layer mode are diffused toward the inside inlet 221 by the flow of outside air flowing through the continuation passage 228 from the outside inlet 220 toward the inside inlet 221. A part of the foreign matters moves to the second part 211A of the filter 21A, and the foreign matters come to be distributed over the whole surface of the filter 21A.

As shown in FIG. 11, the foreign matters are uniformly distributed to stay on the outer surface of the filter 21A from the first part 210A to the second part 211A of the filter 21A. Thereby, when the two layer mode is switched into the outside air mode, the amount of the foreign matters which continue adhering to the first part 210A of the filter 21A at the two layer mode is decreased. Therefore, the clogging of the filter 21A can be reduced and balanced, and the replacing times of the filter 21A can be reduced.

According to the second embodiment, the filter 21A of the air sending unit 2A has the wave-shaped cross-section. The valley part 212 defined by folding the filter 21A is formed to extend in a direction parallel to a flowing direction of outside air which flows toward the inside inlet 221 at the outside air mode.

Because the valley part 212 extends along the main direction of the outside air which flows through the continuation passage 228, the foreign matters adhering to the first part 210A of the filter 21A at the two layer mode can be smoothly moved toward the inside inlet 221. Furthermore, the surface of the filter 21A can be made smooth without resistance component, because the filter 21A has the inclination posture in which the second part 211A is located at the lower position, and because the valley part 212 extends in the main direction of the outside air. Thus, the foreign matter can move using the self weight and the thrust power generated by the flow of outside air. Therefore, the foreign matters can be efficiently dispersed on the surface of the filter 21A.

Other Embodiments

The present disclosure is not limited to the above embodiments.

In the above embodiments, when the two layer mode is switched into the outside air mode, the foreign matter adhering to the surface of the filter moves toward the second part 211, 211A from the first part 210, 210A. Alternatively, the foreign matter may be made to move from the first part 210, 210A to a place not affected by the clogging such as an edge part of the filter.

The door 223, 224 is not limited to the cantilever type door. Alternatively, the door 223, 224 may be a butterfly type door which has a support part in the center. section, or a slide type door.

Such changes and modifications are to be understood as being within the scope of the present disclosure as defined by the appended claims.

What is claimed is:

1. An air-conditioner for a vehicle comprising:
    an air conditioning unit which conditions air to be sent into a passenger compartment of the vehicle; and
    an air sending unit which supplies air to the air conditioning unit, wherein
    the air sending unit includes
        an air intake device having a first inlet through which outside air outside of the passenger compartment flows into the air intake device and a second inlet through which inside air inside of the passenger compartment flows into the air intake device, the first inlet and the second inlet being opened at a two layer mode, the first inlet being opened and the second inlet being closed at an outside air mode, the air intake device being configured to be switched between the outside air mode and the two layer mode,
        a filter arranged to cover a lower part of the first inlet and a lower part of the second inlet to collect a foreign matter contained in the outside air and the inside air, the filter having a first part adjacent to the first inlet and a second part adjacent to the second inlet, and
        an air sending device located under the filter,
    the air intake device defines a continuation passage at the outside air mode, the continuation passage causing the outside air drawn from the first inlet to flow from the lower part of the first inlet to the lower part of the second inlet,
    the air sending device draws the outside air through the first inlet, the continuation passage and the first part and the second part of the filter at the outside air mode,
    the filter is arranged to be inclined to an air intake part of the air sending device,
    the air intake device further includes a passage partition door which divides an interior space of the air intake device into a first space corresponding to the first part of the filter and a second space corresponding to the second part of the filter when the two layer mode is set, and
    the passage partition door is movable to cause the first space and the second space to communicate with each other when the outside air mode is set.

2. The air-conditioner according to claim 1, wherein the filter is arranged in a manner that the first part of the filter is located higher than the second part of the filter.

3. The air-conditioner according to claim 1, wherein the filter has a wave-shaped cross-section including a valley part, and
    the valley part extends in a direction perpendicular to a flowing direction of the outside air which flows through the continuation passage at the outside air mode.

4. The air-conditioner according to claim 1, wherein the filter has a wave-shaped cross-section including a valley part, and
    the valley part extends in a direction parallel with a flowing direction of the outside air which flows through the continuation passage at the outside air mode.

5. The air-conditioner according to claim 1, wherein the air intake device defines a first independent passage and a second independent passage independent from each other at the two layer mode,
    the first independent passage introduces the outside air drawn from the first inlet, and
    the second independent passage introduces the inside air drawn from the second inlet, and
    the air sending device draws the outside air through the first inlet, the first independent passage and the first part of the filter, and draws the inside air through the second inlet, the second independent passage and the second part of the filter, at the two layer mode.

6. The air-conditioner according to claim 1, wherein the continuation passage is constructed by the first space and the second space communicating with each other as one space when the outside air mode is set, such that the outside air drawn from the first inlet flows both the first part and the second part of the filter through the continuation passage, and
    the continuation passage is separated into the first space and the second space when the two layer mode is set, such that the outside air drawn from the first inlet flows the first part of the filter through the first space and that the inside air drawn from the second inlet flows the second part of the filter through the second space.

7. The air-conditioner according to claim 1, wherein the filter is disposed between the air sending unit and the air sending device.

8. The air-conditioner according to claim 1, wherein the filter is disposed at a downstream side of the air sending unit in a direction of air flow through the air sending unit and the air sending device is disposed at a downstream side of the filter in a direction of air flow through the filter.

9. The air-conditioner according to claim 1, wherein the outside air is separated from the inside air by the passage partition door when the two layer mode is set.

10. The air-conditioner according to claim 1, wherein the filter is divided into a first portion open to the first inlet and a second portion different than the second portion open to the second outlet by the passage partition door when the two layer mode is set.

11. An air-conditioner for a vehicle, the air-conditioner comprising:
- an air intake device having a first inlet through which outside air from outside the vehicle flows into the air-conditioner and a second inlet through which inside air from inside the vehicle flows, the first inlet and the second inlet being opened in a two layer mode, the first inlet being opened and the second inlet being closed in an outside air mode;
- a filter disposed downstream of the air intake device in a flow direction of air through the intake device;
- a movable passage partition device disposed between the air intake device and the filter, the passage partition device separating the air intake device into an outside air passage between the first inlet and the filter and an inside air passage, separate from the outside air passage, between the second inlet and the filter in the two layer mode, the movable passage partition device allowing communication between the outside air passage and the inside air passage in the outside air mode;
- an air sending device disposed downstream from the filter in a direction of air flow through the filter, the air sending device drawing air from both the outside air passage and the inside air passage.

12. The air-conditioner according to claim 11, wherein the filter is divided into a first portion open to the first inlet and a second portion different than the second portion open to the second outlet by the passage partition door when the two layer mode is set.

* * * * *